RESISTOR ELEMENT AND METHOD FOR MANUFACTURING THE SAME

Filed Nov. 19, 1965

INVENTORS
TERUO HAYASHI
KATSUO SATO
BY HIROYUKI KOBAYASHI
Hopgood & Calimafde
ATTORNEYS

United States Patent Office 3,472,688
Patented Oct. 14, 1969

3,472,688
RESISTOR ELEMENT AND METHOD FOR MANUFACTURING THE SAME

Teruo Hayashi, Katsuo Sato, and Hiroyuki Kobayashi, Tokyo, Japan, assignors to Nippon Electric Company Limited, Tokyo, Japan, a corporation of Japan

Filed Nov. 19, 1965, Ser. No. 508,688
Int. Cl. B44d *1/18;* C23c *13/04*
U.S. Cl. 117—212 7 Claims

ABSTRACT OF THE DISCLOSURE

A resistor element is formed by (1) providing an oxide film on the surface of a silicon, germanium, ceramic, glass or quartz substrate, (2) depositing a layer of aluminum, chromium or magnesium on the oxide film, and (3) heat treating the article to cause the metal to react with the oxide to form the resistor element.

This invention relates to a resistor element and method of making the same which is particularly useful for integrated circuit applications.

Figure 1:
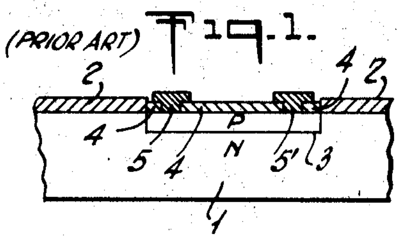
FIG. 1. (PRIOR ART)
Figure 8:
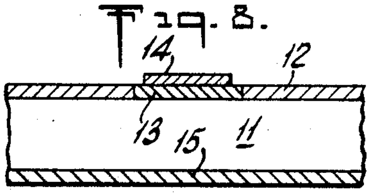
Figure 9:
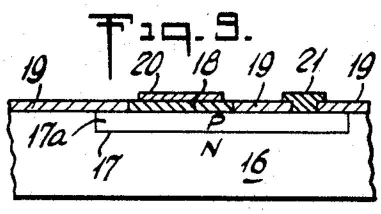
Figure 10:
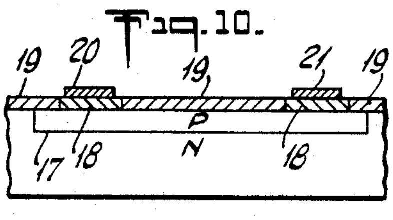
Figure 11A:
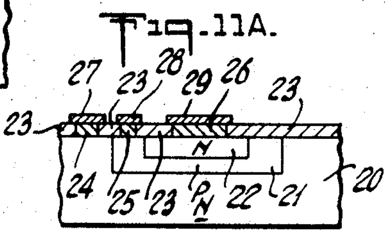
Figure 11B:
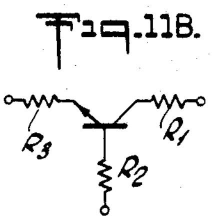

The invention, together with all of the objects, features and advantages thereof and the manner of attaining them will become apparent and the invention itself will be best understood by reference to the description which follows, taken in conjunction with accompanying drawing, in which:

FIG. 1 is a cross sectional view of a resistor element utilizing a P-N junction which has been conventionally used, FIGS. 2 through 6 are cross sectional views of a resistor element made according to the present invention which illustrate various steps in the manufacturing method thereof, FIGS. 7A through 7F show several modifications of the resistor element according to the present invention, FIGS. 8 through 10 are cross sectional views of still other embodiments of the invention, FIG. 11A shows a cross sectional view of yet another embodiment of the invention, applied to a diffused type transistor, and FIG. 11B shows the equivalent circuit of the embodiment of FIG. 11A.

The most widely used resistor element in the conventional integrated circuit is the diffused type resistor, which utilizes the sheet resistivity of a diffused layer. Such a resistor may be obtained, for example, by diffusing P-type impurities through an opening in an oxide layer 2 formed on an N-type silicon substrate 1, as shown in FIG. 1. The opening through which the impurities diffuse into the silicon may be formed, for example, by photoengraving techniques such as that using the well known Kodak Photoresist on the silicon oxide film layer 2 formed on the substrate. As is clear, a P-N junction 3 results from the selective diffusion of the P-type impurities into the N-type substrate. The substrate 1 is then again oxidized and the opening is covered with an oxide film 4 in which electrode windows are formed by means of the photoengraving technique. Electrodes 5 and 5' are then formed in the windows, the desired resistance appearing thereacross.

In this structure the surface concentration of impurities cannot be lower than a certain level because of various limitations, as is well known to those knowledgeable in the art. Accordingly the shape of the opening, namely the shape of the diffused region, must be narrow and long, if a high resistance element is needed. Such a shape of the opening in the silicon oxide film is not desirable from an economical point of view because of the area it occupies, and furthermore, it is difficult to photoengrave such a shape in silicon oxide.

In accordance with the present invention there is provided a resistor element having a stable and high resistance, and a simple method for manufacturing the same.

Briefly, in accordance with the invention, a substance is formed by reaction between an aluminum film and a silicon oxide film when heat of 600° C. or above is applied thereto; one suitable arrangement would comprise an oxide film formed, for example, on a silicon substrate and an aluminum film formed thereupon by vacuum deposition techniques. The substance thus formed has a conductivity or resistance value depending upon the heating temperature and the film thickness.

Figure 2:
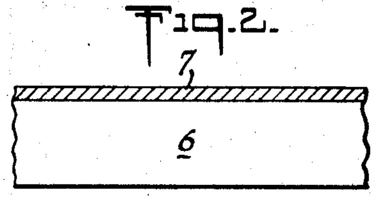
Figure 3:
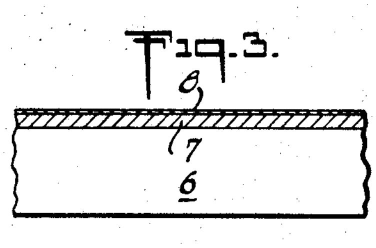
Figure 4:
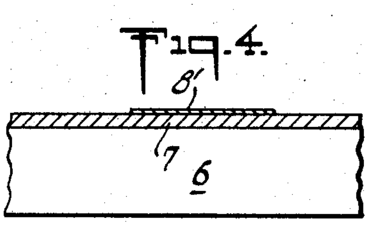
Figure 5:
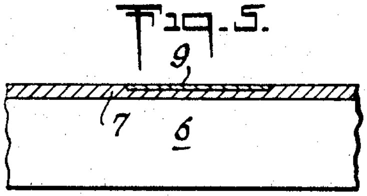
Figure 6:
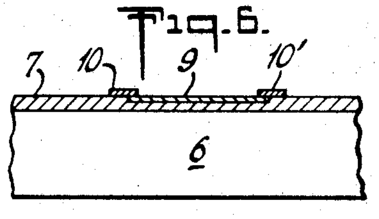
Figure 7A:
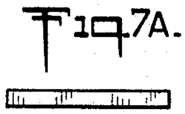
Figure 7B:
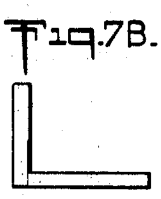
Figure 7C:
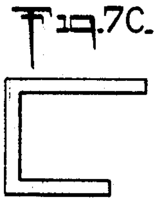
Figure 7D:
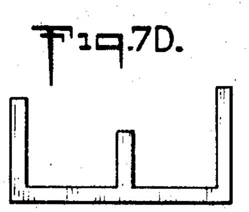
Figure 7E:
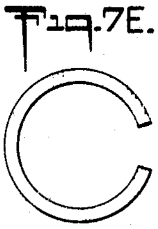
Figure 7F:
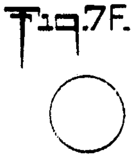

The present invention will now be described with reference to the accompanying drawings. In FIG. 2, a substrate 6, for example of silicon, germanium, ceramic, glass or quartz, has a silicon oxide film 7 formed thereon. A metallic film 8 having a strong deoxidizing property, for example of aluminum, magnesium, or chromium is deposited over the entire surface of the oxide film 7, as shown in FIG. 3. The film is then photoengraved as shown in FIG. 4, leaving a metallic film 8' of necessary or desired pattern or shape, which may be, for example one such as shown in FIGS. 7A through 7F. The metallic film with the necessary or desired pattern may be formed by using a suitable mask having a master pattern opening, the deoxidizing metal being selectively deposited through the opening, instead of using the photoengraving technique. Upon heat treating the element shown in FIG. 4, at a suitably high temperature, a layer 9 is formed according to the invention by reaction between the silicon oxide film 7 and the deoxidizing metallic film 8', the latter infiltrating into and deoxidizing the former, as shown in FIG. 5. The layer 9 thus formed has a conductivity characteristic which is utilized in the present invention to provide a resistive element. The resistance of the layer 9 is determined by the temperature of the heat treatment, the geometry of the deoxidizing metal remaining on the silicon oxide film, and the thickness of the deposited film. An electrode material is then deposited on the entire surface of the element shown in FIG. 5, and the undesired portions of this deposited material are removed by the photoengraving technique, leaving electrodes 10 and 10' with suitable geometries on the end portions of the layer 9, formed between the deoxidizing metal 9 and silicon oxide film 7 as shown in FIG. 6. Thus the resistor element according to the present invention is formed, and the manufacturing method being briefly described in accordance with the foregoing.

A specific embodiment of the method aspect of the invention will next be described. In this illustrative manufacturing process, silicon and aluminum are used as the substrate and deoxidizing metal, respectively, and the preferred method is as follows.

Step (1)—Refer to FIG. 2

A silicon dioxide film 7 of approximately 1.3$\mu$ in thickness is formed on the surface of the silicon substrate 6 by oxidation at approximately 1200° C., for example, for approximately 2 hours in an atmosphere of steam.

Step (2)—Refer to FIG. 3

An aluminum film 8 of approximately 800 A. in thickness is next formed on the surface of the oxide film by vacuum deposition.

Step (3)—Refer to FIG. 4

Portions of the aluminum film 8 are then removed by photoengraving technique, leaving a strip of aluminum film 8′ of about 0.030 mm. in width and 0.234 mm. in length.

Step (4)—Refer to FIG. 5

The element is then heat treated generally in the range of 600° to 800° C. in a nitrogen flow of approximately 5 liters per minute, the specific temperature depending upon the ultimate resistance value desired.

Step (5)—Refer to FIG. 6

Electrodes are then so attached at the ends of the strip that the resistor portion is about 0.030 mm. in width and 0.200 mm. in length. Aluminum is preferably used as the electrode material. This completes the resistor element.

Resistor values between the electrodes were measured as shown in Table I below, for different temperatures of heat treatment under Step (4) above. The temperature of the heat treatment was varied from 600° C. to 800° C. in steps of 50° C.

TABLE I

| Temperature of heat treatment: | | Resistor value |
|---|---|---|
| 600° C. | ohms | 8–10 |
| 650° C. | kilohms | 230–270 |
| 700° C. | do | 250–310 |
| 750° C. | do | 400–550 |
| 800° C. | megohms | 1.0–1.2 |

It will thus be seen that the resistor value can be controlled to a predetermined figure merely by setting the temperature of the heat treatment at a preselected point.

It has been shown by the description above that a resistor may be easily fabricated in the layer formed by the reaction between a silicon oxide film and a deoxidizing metal. Another embodiment of a resistor element will now be described wherein a silicon oxide film and a deoxidizing metal react with each other and form a layer which penetrates through the oxide film to reach the substrate. Referring to FIG. 8, a substrate 11 of semiconductive material such as silicon, germanium or the like is employed, on which a silicon oxide film is formed. A deoxidizing metal, such as aluminum, not shown in FIG. 8, is deposited on a selected area of the oxide film 12 in accordance with the principles discussed above, to form a layer 13 in the silicon oxide film 12 by the reaction between the oxide film and deoxidizing metal, this layer 13 reaching the substrate. The portion of the layer 13 between the electrodes 14 and 15 is employed as the resistor element.

In FIGS. 9 and 10 a substrate 16 of semi-conductive material such as silicon, germanium or the like has a PN junction 17 formed therein, wherein the resistance of the P-type layer 17*a* and that of the layer 18 formed by the reaction between the silicon oxide film and deoxidizing metal in accordance with the above described principles of the present invention are employed together as the resistor element. The numeral 19 in FIGS. 9 and 10 denotes silicon oxide films and numerals 20 and 21 indicate electrodes.

FIG. 11B is a circuit diagram showing an NPN transistor having a resistor element formed in each of the emitter, base and collector thereof, and FIG. 11A shows a cross section of a transistor device which conforms to the diagram of FIG. 11B with resistor elements according to the present invention used therein. Numerals 20, 21 and 22 indicate, respectively, a collector region of N-type silicon, a base region of P-type silicon, and an emitter region of N-type silicon. A silicon oxide film 23 is formed on the transistor device of FIG. 11A. In the silicon oxide film 23 are resistor elements 24, 25 and 26, formed by a reaction between the silicon oxide film and a deoxidizing metal according to the present invention. The numerals 27, 28 and 29 indicate electrodes. The resistor elements 24, 25 and 26 correspond to $R_1$, $R_2$, and $R_3$ respectively in FIG. 11B, and are determined by the thickness and geometry of the deoxidizing metal film, and the temperature of the heat treatment.

Although the present invention has been described with reference to several specific embodiments, it should be noted that the invention is also applicable to the manufacture of integrated circuits having diodes and/or transistors.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. A resistor element comprising, a nonmetallic substrate selected from the group consisting of silicon, germanium, ceramic, glass and quartz, an oxide film formed essentially of silicon and oxygen on a surface of said substrate, a layer of a resistor element having a predetermined resistance characteristic formed in said oxide film, said layer being formed of a composition consisting essentially of silicon oxide and a deoxidizing metal selected from the group consisting of aluminum, chromium and magnesium, and spaced electrodes attached to the surface of said layer.

2. The invention as described in claim 1, wherein said layer is formed of a composition consisting of silicon oxide and aluminum.

3. A method of manufacturing a resistor element which comprises the steps of forming an oxide film of essentially silicon and oxygen on the surface of a substrate selected from the group consisting of silicon, germanium, ceramic, glass and quartz, depositing a deoxidizing metal selected from the group consisting of aluminum, chromium and magnesium on the surface thereof, heat treating the device thus formed so that said oxide film and said deoxidizing metal are caused to react with each other by infiltration of said metal into said oxide film to thereby form a conductive material which forms said resistor element, and depositing spaced metal electrodes on the surface of reaction layer.

4. The method as described in claim 3, wherein said deoxidizing metal is aluminum.

5. The method as described in claim 3, wherein the resistance value of said resistor element is increased by increasing the temperature of heat treatment.

6. The method as described in claim 3, wherein the heat treatment is carried out over the tempertaure range of about 600° to 800° C.

7. The method as described in claim 3, wherein the heat treatment is carried out in an atmosphere of nitrogen.

References Cited

UNITED STATES PATENTS

| | | | |
|---|---|---|---|
| 2,808,351 | 10/1957 | Colbert et al. | 117—217 X |
| 3,203,830 | 8/1965 | Ostrander et al. | 117—106 X |

OTHER REFERENCES

Handbook of Chemistry and Physics, 42nd ed., Cleveland, Ohio, Chemical Rubber Publishing Co. (1960), pp. 1882, 1883, 1892, 1893, 1898, 1899, 1914 and 1915.

Lehman, H. S.: Chemical and Ambient Effects on Surface Conduction in Passivated Silicon Semiconductors, IBM Journal of Research and Development, 8(4), September 1964, pp. 422–426.

ALFRED L. LEAVITT, Primary Examiner
C. K. WAFFENBACH, Assistant Examiner

U.S. Cl. X.R.

29—610; 117—62, 107, 217, 222; 338—308